United States Patent [19]
Defazio

[11] 3,728,776
[45] Apr. 24, 1973

[54] EPOXY COATING OF REFURBISHED BALLS

[76] Inventor: Louis D. Defazio, Box 19A Newbury St., Seabrook Beach, N.H. 03874

[22] Filed: Apr. 19, 1971

[21] Appl. No.: 135,198

[52] U.S. Cl. .................... 29/401, 117/8, 117/18, 117/21
[51] Int. Cl. ............................................. B23p 7/00
[58] Field of Search ............... 117/8, 21, 161 ZB, 117/DIG. 6, 18; 29/401, 527.4; 137/375

[56] References Cited

UNITED STATES PATENTS

| | | | |
|---|---|---|---|
| 3,090,696 | 5/1963 | Gemmer | 117/21 |
| 2,984,895 | 5/1961 | Griffin et al. | 29/401 |
| 2,844,489 | 7/1958 | Gemmer | 117/21 X |
| 3,459,578 | 8/1969 | Laulan | 117/18 |
| 3,508,573 | 4/1970 | Smith | 137/375 |
| 3,073,336 | 1/1963 | Johnson | 137/375 |

Primary Examiner—William D. Martin
Assistant Examiner—Theodore G. Davis
Attorney—R. S. Sciascia, L. I. Shrago and C. E. Vautrain, Jr.

[57] ABSTRACT

A process is provided for epoxy coating seawater valve balls and other valve balls in marine use to provide a surface finish greatly exceeding in durability the normal finish of the balls. Valve balls requiring refinishing are machined to a selected smaller diameter than that required and then coated in several applications in a fluidized bath under proper heat to a greater diameter than required. The ball is then machined to the desired diameter and hand-finished where necessary.

7 Claims, 12 Drawing Figures

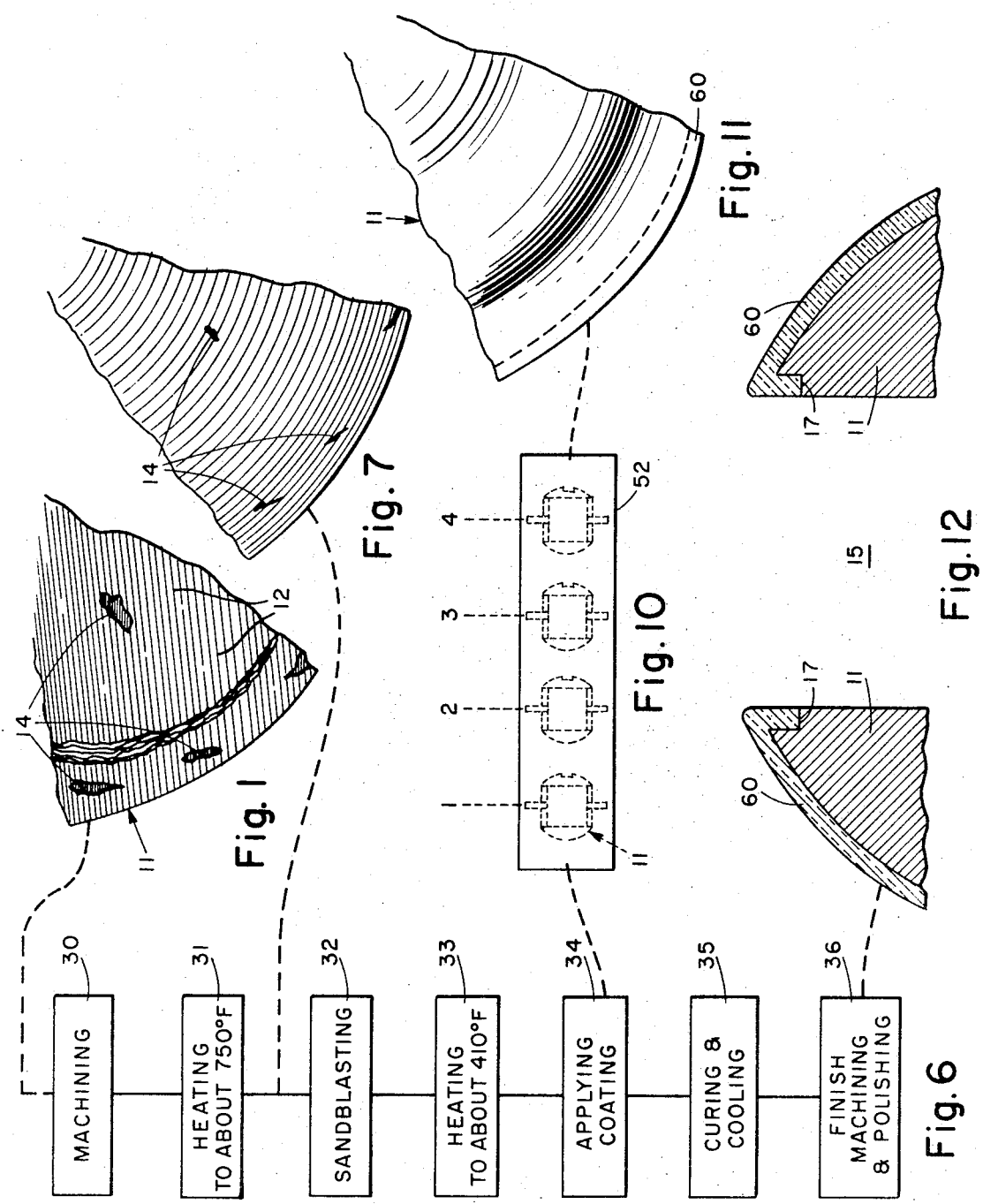

Patented April 24, 1973
3,728,776
2 Sheets-Sheet 2
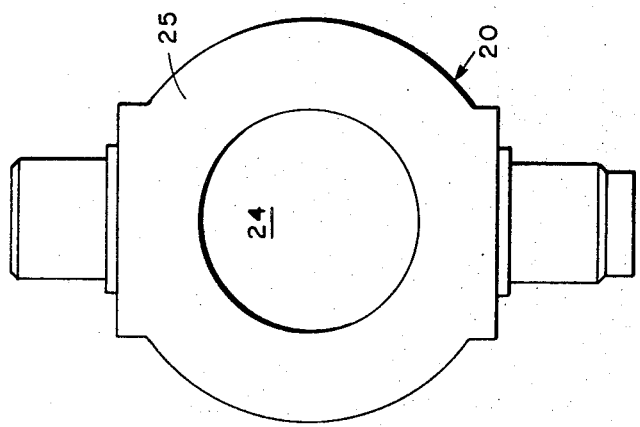
Fig. 5
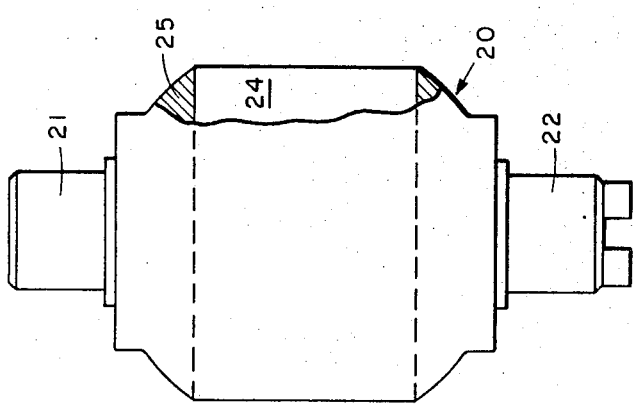
Fig. 4
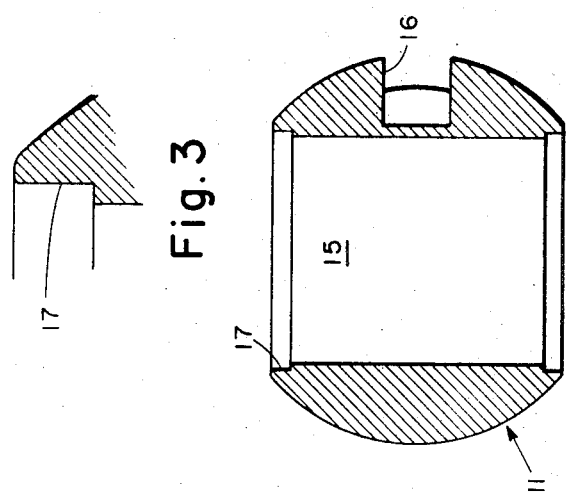
Fig. 2
Fig. 3
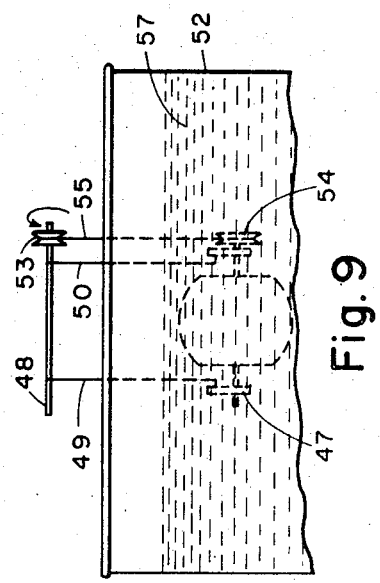
Fig. 9
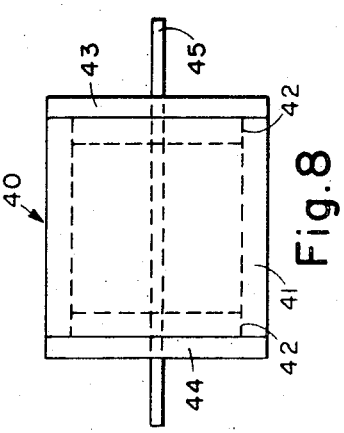
Fig. 8
INVENTOR
Louis D. Defazio

EPOXY COATING OF REFURBISHED BALLS

The invention described herein may be manufactured and used by or for the Government of the United States of America for governmental purposes without the payment of any royalties thereon or therefor.

This invention concerns improving the surface finishes of valve balls and, more particularly, providing an epoxy coating for such valve balls.

Valve balls are used extensively in modern marine construction, many in positions where they are exposed to seawater at great pressure. These balls generally are confined in a housing and turned by shafts which extend radially into the ball. The wear on such valve balls is severe and, in most cases, requires that the balls be replaced within approximately one year. This replacement is necessary to both protect the watertight integrity of the ships using the valve balls and to protect the valve seats. The replacement of such valve balls involves great expenditures in both the man-hours needed to remove the damaged balls and in the very high cost of the individual balls. The existing practice of scrapping the valve balls after a short period of operation is therefore extremely wasteful. Operation of a valve ball is dependent upon the amount of squeeze that the valve seats are subjected to. Because of this, the ball diameter cannot be reduced in a refinishing process without a resulting reduction in the sealing capabilities of the valves. As a result, new valve balls must be used to repair or service seawater ball valves.

Various means have been tried to prevent or limit corrosion effects on the sealing surfaces of ball valves. The balls become pitted by corrosion and scratched and gouged by particles caught between the ball and the valve seat, among other damages sustained. To prevent such damage, various coating processes have been tried, among which are ceramic coating whereby a layer of ceramic coating is fused to the ball valve at high temperature. Another process is that of Teflon coating, but the function of such a coating is directed more toward lubrication than toward corrosion inhibition. Corrosion pits only a few thousandths of an inch deep in the Teflon coating may be repaired by honing the ball and recoating with Teflon. These protective methods are extremely costly and exceed the cost of a new ball but, nevertheless, have been used due to the delay occasioned in ordering and receiving replacement balls. The latest attempt to combat corrosion has been the introduction of the use of titanium balls. While all reports show that the corrosion resistance of titanium is excellent, there are other factors such as softness of the metal and cost which greatly reduce its desirability.

The steps which have been taken and means tried to prevent or to limit effects of corrosion and wear on valve balls thus have not been economical or effective. The present invention provides a means for and method of enabling existing valve balls to be reused by the application of an inexpensive, hard and durable coating in lieu of being replaced by a valve ball of similar composition or one of the expensive and somewhat soft metal titanium.

In the present invention, the damaged ball is machined or rough ground to at least a "250" finish with substantially 0.015 inch removed from the radius of the ball. The ball is then heated to substantially 750°F and maintained at that temperature a sufficient time to drive off oil and/or other material that may have become entrapped in the pores of the ball. The ball is next sandblasted to provide a desired surface for adherence of an epoxy coating, areas of the ball not to be coated being covered by masking tape or other conventional means. The ball is then heated to at least 410°F and, while still hot, is dipped successively, while being slowly rotated, into a fluidized bed of epoxy powder. This process is repeated with very little delay three or four times to obtain the required coating thickness. After the coating has been applied, the ball is maintained in an oven at substantially 400°F for at least 10 minutes to insure that the surface layer of the epoxy is completely cured after which the ball is cooled and finish-machined to the required dimensions.

Accordingly, it is an object of the present invention to provide a means for and method of bonding to valve balls a coating which exceeds the characteristics of the original finish thereof.

Another object of this invention is to render valve balls reusable.

A further object of the present invention is to provide a means for and method of applying an epoxy coating of desired thickness and hardness to valve balls and other components which are exposed to highly corrosive environments and subjected to hard usage.

Other objects, advantages and novel features of the invention will become apparent from the following detailed description thereof when considered in conjunction with the accompanying drawings in which like numerals represent like parts throughout and wherein:

FIG. 1 is a sketch illustrating the condition of ball surfaces when received for resurfacing;

FIG. 2 is a sectional view of a floating type of valve ball;

FIG. 3 is an enlarged sectional view of a portion of the ball of FIG. 2 illustrating the counterbore formed to receive the epoxy coating;

FIG. 4 is a plan view partly cut away of a valve ball of the trunion type;

FIG. 5 is a side elevation of the trunion ball of FIG. 4;

FIG. 6 is a block diagram of the steps in the present method of finishing valve ball surfaces;

FIG. 7 is a schematic diagram of the surface of the ball of FIG. 1 after machining and heating but before sandblasting;

FIG. 8 is a schematic diagram of insert means for supporting the ball when a coating is being applied;

FIG. 9 is a schematic diagram of a fluidized bed having a ball immersed therein for coating;

FIG. 10 is a schematic diagram illustrating the successive coating steps of the method;

FIG. 11 is a schematic diagram of the surface of the ball in FIG. 1 after coating with epoxy; and FIG. 12 is a sectional view of the ball in FIG. 1 after the epoxy coating has been finish-machined.

Referring to the drawings, FIG. 1 shows a ball to be reconditioned 11 having a plurality of parallel striations 12 which are formed when a ball is rotated in its valve seat, and nicks and gouges 14 in the surface of the ball.

FIG. 2 illustrates the most common type of ball that requires reconditioning, this ball having a large central waterway 15 and a recess or seat 16 for accommodating a control means, not shown. Ball 11 in this view is shown after a counterbore 17 has been made at either end of the waterway to provide a corner foundation for the epoxy coating. Counterbore 17, shown in greater detail in FIG. 3, extends longitudinally along waterway 15 a distance on the order of one-fourth inch and has a depth less than the thickness of the coating to be applied. FIGS. 4 and 5 illustrate a trunion type ball 20 in two separate views, this type of ball having mounting and control means 21 and 22 which are secured in conventional manner to the ball at opposite ends thereof, a waterway 24 and a limited spherical bearing surface 25 upon which the epoxy coating is to be applied.

FIG. 6 illustrates the steps in the method of repairing a damaged ball for surfacing with epoxy and for applying the epoxy coating. Ball 11 having outer surface irregularities such as those indicated in FIG. 1 is first machined in step 30 to reduce the radius of the ball substantially 0.015 inch. At this time counterbore 17 is made in the waterway of the ball. The counterbore is formed using the interior wall of the passageway as a reference so that in the final product the outer dimensions of the ball may be precisely related to the original waterway thereof. The ball is next heated in step 31 to about 750°F and maintained at that temperature for substantially one hour to drive off impurities such as oil which may have been trapped in the pores of the metal. In order to insure a desired surface adherence of the epoxy coating, the ball is next sandblasted as indicated in block 32 preferably using No. 80 aluminum oxide grit, a 1-inch nozzle and 75 to 90 lbs. air pressure at a standoff distance of from 6 to 8 inches. It will be noted in FIG. 7 that the gouges and nicks 14 have been reduced in diameter by machining but still present cavities which may be filled with epoxy in the normal process of dipping in a fluidized bed which is described hereinafter. Excessively large cavities preferably are filled by welding before the ball is machined.

After the sandblasting step 32, the areas of the ball that are not to be coated with epoxy are masked, and it has been determined that effective masking can be obtained through use of conventional masking tape. Step 33, heating to about 410°F, is next in the process. The time that the ball is maintained in a furnace to perform this step depends upon the mass of the ball. That is, balls of small diameter and having a large central opening may be heated in a substantially lesser time than balls of larger diameter such as from 15 to 20 inches.

With the ball at or substantially at a temperature of 410°F pursuant to step 33, it is mounted on a jig 40 such as shown in FIG. 8 to facilitate applying the epoxy coating. Jig 40 can be any supporting form which may be accommodated securely within the ball, for example, a cylindrical insert 41 preferably formed of silicon rubber and adapted to receive heat resistant end caps 43 and 44, the end caps having openings to receive in close fit a square shaft 45. Insert 41 and end caps 43 and 44 are prepared for each waterway configuration so as to position the outer surfaces of the end caps at or slightly within the lip of counterbore 17, leaving the entire counterbore exposed for coating. The jig and ball then in step 34 are placed in any suitable frame such as frame 47 shown in FIG. 9 and lowered into the bath by hand using a rod 48 and supporting cords 49 and 50. It is desirable that the coating be applied as evenly as possible, and in accomplishing this, it has been found preferably to turn the ball while it is immersed in a fluidized bed such as indicated at 52. To facilitate turning, a pair of sheaves 53 and 54 are provided and a belt 55 mounted thereon so that hand turning of sheave 53 will be relayed to wheel 54 and ball 11 which are immersed in epoxy powder 57 of fluidized bed 52.

The epoxy coating is applied in step 34 to the desired thickness of epoxy preferably in three or four separate immersions as indicated in FIG. 10. In the present embodiment of the invention, step 34 was accomplished using an Armstrong Fluidized Bed containing Armstrong No. E-8530-2 Epoxy Powder from the Armstrong Products Co., Inc., Warsaw, Ind. A sufficient drying time is allowed between immersions to permit the epoxy to solidify but not to cool significantly. After the final immersion, the outer surface of the ball is as illustrated in FIG. 11, i.e., visually smooth to unaided vision but having a greater diameter than the final required diameter. Upon completion of the coating applications, the ball is cured in step 35 for a minimum of 10 minutes at 410°F in order to insure a complete hardening of the epoxy. The ball is handled between steps 33 and 35 in jib 40, a rack being provided in the oven or ovens used so that the ball may be suspended during curing. Upon completion of the curing step, the ball having a hardened coating 60 of hardness 93–100 is removed from the oven and allowed to cool. The masking and handling gear may be removed while the ball is cooling to room temperature. FIG. 12 shows ball 11 after the finish machining and/or hand polishing of step 36 have been completed. Finish machining preferably is accomplished with a diamond cutter to the diametrical tolerance required. The ball then may be hand polished to a required surface finish preferably with No. 500 silicon carbide grit screening and honing oil.

Upon completion of steps 30 — 36, coating 60 preferably is visually inspected for appearance, adhesion and porosity and measured to ascertain that it meets engineering requirements. Prototype models are cycled and torque tested, and also subjected to high impact and hydraulically shock tested. Production units are not subjected to these tests.

In step 34, it is very important that the ball not be allowed to cool appreciably since cooling inhibits the fusing of the successive layers of epoxy and is evidenced by a rough mottled surface. When this situation occurs, the epoxy is stripped from the ball with a knife or other suitable tool. Reheating may be necessary to soften the coating for stripping. No attempt to Teflon-coat a epoxy-coated ball should be made since the temperatures required to cure Teflon will destroy the epoxy surface.

Valve balls coated in the manner described herein have passed several additional tests to assure their reliability in service. Since some families of plastics exhibit a tendency to "cold flow," which action would result in thickened portions of coating and would lock the ball permanently in one position, a valve having an epoxy coated ball inserted therein was submitted to a lengthened breakaway torque test with no cold flow noticed. Water absorption also would be undesirable, hence an informal water absorption test was conducted by placing epoxy coated balls in a materials test tank. The tank used was directed to studying corrosion resistance of metal samples in warm, flowing seawater. Epoxy coated balls placed in the tank in May 1969 showed no noticeable difference in condition as late as July of 1970.

Testing under service conditions wherein a simple comparison was made between a Teflon-coated Monel ball and an epoxy coated ball disclosed striations such as those indicated at 14 in FIG. 1 on the Teflon coated ball whereas the epoxy coated ball showed no surface marring whatsoever. The comparison balls, of course, were subjected to substantially the same usage. In summary, epoxy coated balls have withstood all laboratory tests and selective service tests to which they have been subjected.

In addition to a valve ball having a more desirable surface being provided by the epoxy coating, there are substantial savings in cost over other methods of refurbishing or replacing a damaged ball. For example, the cost to coat and machine a single 4-inch ball in small lots has been determined to be substantially one-fourth the cost of replacing damaged balls with Monel balls. Since the epoxy coating process is relatively simple, virtually any marine facility can use existing equipment or economically obtain the additional equipment necessary to refurbish balls by the epoxy coating method described and illustrated herein.

Obviously many modifications and variations of the present invention are possible in the light of the above teachings. For example, the entire process after step 30 could be automated and valve seats as well as valve balls could be epoxy coated. Also, other fluidized beds using the same or a different epoxy powder capable of providing a comparable coating could be used within the concept of the invention.

What is claimed is:

1. A method of applying a durable, machineable, non-metallic coating to a seawater valve ball wherein the applied coating exceeds the characteristics of the original finish thereof which comprises:
   counterboring the center passageway of the ball a selected short distance to provide an anchoring means for the coating to be applied;
   reducing the outer diameter of the ball an amount significantly in excess of the desired finished dimensions to provide selected depth of coating;
   heating the ball to at least 750°F and maintaining this temperature a time sufficient to drive off impurities in the surface of the ball;
   abrading the surface of the ball to provide a desired foundation for receiving an epoxy coating;
   heating the ball to a temperature of at least 410°F and while at this temperature successively dipping the ball while rotating it slowly into a fluidized bed of finely divided undecomposed particles of epoxy powder;
   maintaining the ball at substantially 400°F for at least a 10-minute period to ensure that all layers of epoxy are completely cured;
   curing the ball at a selected temperature for a selected period of time;
   machining the outer surface of the ball and the coated portion of the passageway to the desired dimensions and finishing the coating as required.

2. The method as defined in claim 1 wherein the step of reducing the outer dimensions of the ball includes machining or rough grinding the ball to a radius substantially 0.015 inch less than the required outer dimension.

3. The method as defined in claim 2 wherein the portion of the passageway not counterbored is masked to prevent epoxy from being applied thereto,
   said coating when applied reducing the inner diameter of the passageway so that the coating when machined will conform precisely to the original passageway.

4. A method for refurbishing worn surfaces or protecting new surfaces of a seawater valve ball, comprising
   reducing the outer diameter of said ball by from about 0.030 inch to about 0.045 inch;
   heating the ball to a temperature sufficient to drive off oil and other impurities;
   abrading the surface of said ball to provide a desired surface for receiving an epoxy coating;
   heating the ball to a temperature sufficient to form a coating thereon of finely divided undecomposed particles of epoxy powder;
   mounting the ball on a jig adapted for immersion into a fluidized bed;
   applying a coating by immersing the ball and jig in and removing them from the bed repeatedly until a coating has been formed whose thickness exceeds the engineering dimensions required of the ball;
   curing the ball at a selected temperature for a selected period of time;
   reducing the diameter of the coated ball to engineering requirements; and
   finishing the surface of the ball as required.

5. The method of claim 4 wherein the coating is prevented from being applied in substantially the entire waterway of said ball by means sealing the interior thereof during the application of said coating so as to maintain the original waterway of the ball as a reference to which the finished dimensions may be conformed.

6. The method of claim 5 and further including the step of continuing said coating into at least a portion of said waterway by counterboring the outer ends of the waterway and exposing the counterbored portions during the application of said coating.

7. The method of claim 6 wherein the outer diameter is reduced by machining and the jig is adapted to permit rotation of the ball during the step of applying a coating.

* * * * *